3,000,905
PRODUCTION OF HYDROXYMETHYL-
DIMETHYL-META-DIOXANES
Edward S. Wheeler, Secane, and Norbert H. Ellis, Philadelphia, Pa., assignors to The Atlantic Refining Company, Philadelphia, Pa., a corporation of Pennsylvania
No Drawing. Filed Jan. 2, 1959, Ser. No. 784,424
11 Claims. (Cl. 260—340.7)

This invention relates to a method for producing hydroxymethyl-dimethyl-meta-dioxanes. More particularly, this invention relates to a method for producing hydroxymethyl-dimethyl-meta-dioxanes from the products boiling above 150° C. at 10 mm. obtained by reacting either isobutylene or butene-2, or both, with formaldehyde or substances yielding formaldehyde in the presence of an acid catalyst.

The hydroxymethyl-dimethyl-meta-dioxanes of this invention have the general formula

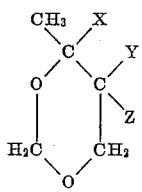

wherein one of the groups X, Y, and Z is $CH_3$, one is $CH_2OH$ and one is H. They are useful as solvents in many industrial applications, particularly as solvents for resins and lacquers.

It is known in the art that meta-dioxanes may be produced by reacting an olefin hydrocarbon with an aldehyde in the presence of an acid catalyst. The type of compound produced depends upon the olefin, aldehyde and catalyst used as well as on the reaction temperature. Although various acidic catalysts, such as mineral acids, phosphotungstic acid and zinc chloride may be used, it is generally preferred to utilize sulfuric acid as the catalyst. Concentrations of this acid may vary from 2 to 85 weight percent depending on the type of olefin feed, and reaction temperatures may range from 5° to 150° C. and higher. Thus, isobutylene may be reacted with formaldehyde or substances yielding formaldehyde, such as paraformaldehyde, at temperatures ranging preferably from 40° C. to 70° C. in the presence of an aqueous sulfuric acid catalyst of about 10 to 40 weight percent concentration, preferably about 25 weight percent concentration, to form 4,4-dimethyl-meta-dioxane. Butene-2 may be similarly reacted with formaldehyde or paraformaldehyde, in the presence of a sulfuric acid catalyst of about 40 to 60 weight percent concentration to form 4,5-dimethyl-meta-dioxane.

It is also known that a normally gaseous hydrocarbon stream obtained from either catalytic cracking or thermal cracking of hydrocarbons or a mixture of such streams and containing a mixture of $C_4$ paraffins and olefins, including isobutylene and butene-2, as well as some $C_3$ and $C_5$ paraffins and olefins, will react with formaldehyde or substances yielding formaldehyde at temperatures ranging preferably from 40° C. to 70° C. in the presence of an aqueous sulfuric acid catalyst to form 4,4-dimethyl-meta-dioxane and 4,5-dimethyl-meta-dioxane. If it is desired to react predominantly the isobutylene in such a stream relatively dilute concentrations of sulfuric acid catalyst, preferably about 25 weight percent, are used in which case 4,4-dimethyl-meta-dioxane will be produced predominantly along with a small amount of 4,5-dimethyl-meta-dioxane from the reaction of butene-2. As the acid concentration is increased, the conversion of butene-2 increases, with acid concentrations of greater than about 40 weight percent resulting in essentially complete conversion of butene-2. A typical analysis of such a normally gaseous hydrocarbon stream resulting from both catalytic cracking and thermal cracking operations follows (in percent by weight):

| | |
|---|---|
| Propene | 1.0 |
| Propane | 0.5 |
| Isobutylene | 13 |
| Butene-2 | 21 |
| Butene-1 | 11 |
| Isobutane | 38 |
| n-Butane | 14 |
| Pentene | 0.4 |
| Isopentane | 1.1 |

The crude product resulting from the reaction of either isobutylene or butene-2, or both, with an aldehyde contains, along with the 4,4-dimethyl-meta-dioxane and 4,5-dimethyl-meta-dioxane, various by-products resulting from these reactions along with some unreacted materials. Among the by-products found in the dimethyl-meta-dioxane distillation residue are small amounts of hydroxymethyl-dimethyl-meta-dioxanes. Thus, in the production of 4,4-dimethyl-meta-dioxane from the reaction of isobutylene with formaldehyde there is also formed a small amount of 4,4-dimethyl-5-hydroxymethyl-meta-dioxane. Similarly in the reaction of butene-2 with formaldehyde there is also formed some 4,5-dimethyl-4-hydroxymethyl-meta-dioxane or 4,5-dimethyl-5-hydroxymethyl-meta-dioxane or both. In the reaction of both isobutylene and butene-2 with formaldehyde all 3 position isomers will be formed in small amounts.

It has now been discovered that the yield of these hydroxymethyl-dimethyl-meta-dioxanes may be substantially increased by hydrolyzing in the presence of an acidic catalyst that portion of the distillation residue boiling above 150° C. at 10 mm. obtained from the above described olefin-aldehyde reactions. In accordance with this invention the products resulting from the reaction of either isobutylene or butene-2 or both with either formaldehyde or paraformaldehyde, or from the reaction of a butane-butene stream with these aldehydes, are distilled under atmospheric pressure followed by vacuum distillation and that portion of the distillation residue boiling above 150° C. at 10 mm. is hydrolyzed by heating with water in the presence of an acidic catalyst. If the crude hydrolyzed material is acidic it is neutralized with sodium hydroxide or other suitable neutralizing agents. The neutral crude material is vacuum distilled and the desired hydroxymethyl-meta-dioxanes are recovered in the fraction boiling at 115° C. —122° C. at 10 mm. The residue from this vacuum distillation may be recycled for further hydrolysis.

Although it is preferred to perform the hydrolysis reaction of the instant invention with those products in the above described distillation residue boiling above 150° C. at 10 mm., it may in some instances be desired not to separate this fraction but to hydrolyze that portion of the distillation residue boiling above 135° C. at atmospheric pressure. If so, the crude product resulting from the olefin-aldehyde reaction is distilled under atmospheric pressure to yield a fraction boiling up to 130° C. consisting mainly of tertiary butyl alcohol and a fraction boiling at about 130° C. to 135° C. consisting of the dimethyl-meta-dioxanes. The portion boiling above 135° C. at atmospheric pressure, which already contains a small amount of hydroxymethyl-dimethyl-meta-dioxanes, as explained heretofore, is then subjected to the hydrolysis reaction and treated in the same manner described heretofore for the treatment of the portion boiling above 150° C. at 10 mm.

The acidic catalyst used in the hydrolysis reaction may be any of the conventional hydrolysis catalysts such as dilute mineral acids or it may be an acidic-ion exchange resin. In carrying out the acid hydrolysis with a mineral acid catalyst such as HCl, the crude hydrolyzed material is neutralized forming an organic layer and a salty aqueous layer. In this instance most of the desired product is in the organic layer and the aqueous layer is discarded. The organic layer is then vacuum distilled to yield the desired products of this invention. It has also been discovered that instead of first neutralizing the crude hydrolyzed material and discarding the aqueous salty layer, it is advantageous to first separate the aqueous and organic layers of the crude hydrolyzed material. In this instance most of the desired compounds are contained in the aqueous layer since no salt is present to drive these compounds into the organic layer. The organic layer is then recycled to the hydrolysis reactor and the aqueous layer is neutralized and vacuum distilled to yield the desired products. In this manner the total amount of the desired product is recovered and the necessity for distilling the organic layer is obviated.

When an ion-exchange resin is used, the distillation residue from the olefin-aldehyde reaction products boiling above 135° C. at atmospheric pressure or that portion of the residue boiling above 150° C. at 10 mm. is contacted, in the presence of water, with the ion-exchange resin in the hydrogen form. The crude hydrolyzed material containing the organic and aqueous layers, which, in this case, are both substantially neutral, is separated from the resin by screening or other suitable means and vacuum distilled. The desired hydroxymethyl-dimethyl-meta-dioxanes are recovered at about 115° C.–122° C. at 10 mm. The residue of this vacuum distillation boiling above 150° C. at 10 mm. may be recycled for further hydrolysis by means of the ion-exchange resin. Since the resin is unaltered by the reaction it does not require regeneration and may be reused for a prolonged period of time.

When an acidic-ion exchange resin is utilized in the hydrolysis reaction, it has been found that in this instance too it is advantageous to separate the organic and aqueous layers of the crude hydrolyzed material. The organic layer is recycled to the hydrolysis reactor, and the aqueous layer is vacuum distilled to yield the desired hydroxymethyl-dimethyl-meta-dioxanes.

In all cases where the aqueous and organic layers are separated, it may be desirable to carry out the hydrolysis reaction in the presence of an unreactive, relatively high boiling solvent such as benzene, toluene or xylene to facilitate the separation of layers and to reduce the viscosity of the residue being hydrolyzed. It is preferred to utilize xylene since a higher hydrolysis temperature can thus be attained. The method of the instant invention may be carried out in a continuous system or it may be carried out batchwise utilizing appropriate agitation.

The ion-exchange resins which may be utilized in the instant invention are preferably those which are characterized as strong acid types and generally contain sulfonic acid groups, such as Amberlite IR–120 and Amberlite IR–112, Dowex 50, Permutit Q and other resins of the sulfonated styrene, sulfonated phenolic and sulfonated coal types. Amberlite IR–120 is a copolymer of styrene and divinylbenzene containing nuclear substituted sulfonic acid groups. Amberlite IR–112 is a strongly acidic, more porous sulfonic acid type of ion-exchange resin. Dowex 50 and Permutit Q are also sulfonated polystyrene resins cross-linked with divinylbenzene. It is preferred to utilize those ion-exchange resins within this class of resins which have high porosity characteristics.

The preferred amount of acidic catalyst used for the hydrolysis reaction, whether it be a mineral acid catalyst or an acidic ion-exchange resin, is that corresponding to from about 0.05 to about 5 milliequivalents of hydrogen ion per gram of residue, and more preferably, from about 1 to 3 milliequivalents of hydrogen ion per gram of residue. In using an ion-exchange resin it is desirable to carry out the hydrolysis using about 0.25 to 1.0 grams of water per gram of residue, although lesser and greater amounts may also be used. In carrying out the hydrolysis reaction with a mineral acid catalyst the concentration of the acid solution charged to the reactor may range preferably from about 0.5 to about 5 weight percent and more preferably from about 2 to 3 weight percent.

It is preferred to carry out the hydrolysis reaction at temperatures ranging from about 60° C. to 100° C. and more preferably from about 90° C. to 100° C. When the hydrolysis is carried out in a closed system under autogenous pressure, higher temperatures may also be used. Reaction periods may range preferably from about 5 to 30 minutes at the desired temperature, but it has been found that reaction periods ranging from about 10 to 20 minutes are more preferable.

The following examples serve to illustrate the instant invention but are not intended to limit it thereto:

EXAMPLE I

*Part A.—Preparation of dimethyl-meta-dioxane residue (B.P. >135° C./atmospheric pressure)*

To a glass lined pressure vessel there were charged 19 pounds of concentrated $H_2SO_4$ (96.8%), 22 pounds of water, 83 pounds of 37% Formalin solution and 8 pounds of 4,4-dimethyl-meta-dioxane. The meta-dioxane was added to accelerate the initiation of the reaction. A 156-pound portion of a mixed $C_4$ refinery gas containing 13 weight percent isobutylene was added over a period of 30 minutes at a temperature of 60° C. with stirring. Stirring and heating were continued at 60° C. for 30 minutes after addition was complete and the acid layer was separated. The organic layer was washed with concentrated NaOH solution to remove water and acid and the aqueous layer was separated. The unreacted hydrocarbon was distilled off, followed by a fractional distillation at atmospheric pressure to recover the 4,4-dimethyl-meta-dioxane distilling at 130° C.–135° C. A portion of the residue of this distillation was used as charge to the fractional distillation of Part B. It is described as dimethyl-meta-dioxane residue, abbreviated: DMDO residue (B.P. >135° C./atm. press.).

*Part B.—Preparation of dimethyl-meta-dioxane residue, (B.P. >135° C./10 mm.)*

A seventeen hundred gram portion of the DMDO residue (B.P. >135° C./atm. press.) prepared in Part A was vacuum distilled at 10 mm. Hg pressure to produce the fractions set forth in Table I.

TABLE I

| Fraction | Boiling Point | Weight (gms.) |
| --- | --- | --- |
| 1 | <115° C./10 mm | 464 |
| 2 | 115°–122° C./10 mm | 170 |
| 3 | 122°–150° C./10 mm | 317 |
| Residue | >150° C./10 mm | 728 |

The residue of this distillation was used for some of the hydrolysis reactions in Examples II and IV wherein the charge is described as "DMDO residue (B.P. >150° C./10 mm.)."

This distillation demonstrates that 10 weight percent of the material having a boiling point >135° C./atm. press. has a boiling range of 115°–122° C./10 mm.

*Part C.—Hydrolysis of residue from Part A*

One hundred and thirty pounds of the DMDO residue (B.P. >135° C./atm. press.) prepared in Part A and 50 pounds of two weight percent HCl solution were charged to a reactor and refluxed with stirring for 10 minutes. The reaction mass was cooled and neutralized with saturated $Na_2CO_3$ solution to a pH of 7. Three pounds of anhydrous $Na_2SO_4$ were added with mixing to salt out the water. The aqueous layer was drawn off and discarded. The organic layer was distilled to give the fractions set forth in Table II

TABLE II

| Fraction | Boiling Point | Weight (lbs.) |
|---|---|---|
| 1 | <100° C./atm. press | 34.3 (including water). |
| 2 | <115° C./10 mm | 17.5. |
| 3 | 115°–122° C./10 mm | 25.1. |
| 4 | 122°–150° C./10 mm | 12.4. |
| Residue | >150° C./10 mm | 37.9. |

It can be seen that after hydrolysis the yield of the fraction boiling at 115°–122° C./10 mm. is 19.3% of the charge or approximately double the amount obtained in Part B.

Fraction No. 3 of Table II was 83% pure hydroxymethyl-dimethyl-meta-dioxane. On redistillation of this material a flat boiling at 118° C./10 mm. was obtained. A sample of the redistilled material was analyzed. The results are set forth in Table III.

TABLE III

| | Observed | Theoretical for $C_7H_{13}O_2OH$ |
|---|---|---|
| B.P. | 118° C./10 mm | |
| $d_4^{20}$ | 1.0969 | |
| $n_D^{20}$ | 1.4632 | |
| $MR_D$ | 36.72 | 36.75 |
| Percent C | 57.5 | 57.1 |
| Percent H | 9.8 | 965 |
| Percent OH | 10.6 (acetyl chloride method) / 12.5 (infra red) | 11.63 |

Infra red and mass spectroscopic data agree with the hydroxymethyl-dimethyl-meta-dioxane structure.

A phthalate ester prepared from fraction No. 3 of Table II gave a material with the following analysis:

Observed:
Weight percent C—62.6, weight percent H—7.2, saponification No.—270,
Molecular weight (from saponification No.)—416.

Theoretical:
Weight percent C—62.5, weight percent H—7.1, saponification No.—266,
Molecular weight—422.

*Part D.*—*Recycle hydrolysis of residue of Part C*

A two-hundred-seventy-five gram portion of the residue from the distillation in Part C (B.P. >150° C./10 mm.) was charged with 100 grams of two weight percent HCl solution to a reactor and refluxed for ten minutes. The reaction mass was neutralized with $Na_2CO_3$ solution and six grams of anhydrous $Na_2SO_4$ were added. The organic layer was separated and distilled to give the fractions set forth in Table IV.

TABLE IV

| Fraction | Boiling Point | Weight (gms.) |
|---|---|---|
| 1 | <100° C./atm. press | Not recorded. |
| 2 | <115° C./10 mm | 5.5. |
| 3 | 115°–122° C./10 mm | 105. |
| 4 | 122°–150° C./10 mm | 2. |
| Residue | >150° C./10 mm | 119. |

Analysis of fraction No. 3 of Table IV showed it to be substantially identical to fraction No. 3 of Table II.

EXAMPLE II

*Part A.*—One hundred and seventy-three grams of DMDO residue (B.P. >150° C./10 mm.) obtained in Part B of Example I and sixty grams of two weight percent HCl solution were charged to a reactor and refluxed with stirring for 15 minutes. The layers were separated with the aid of 30 ml. of benzene. The resulting aqueous layer was further extracted with 10 ml. benzene and the benzene wash was added to the above benzene solution. The aqueous layer was neutralized with NaOH solution of a pH of 7 and distilled to give the fractions set forth in Table V.

TABLE V

| Fraction | Boiling Point | Weight (gms.) |
|---|---|---|
| 1 | <110° C./atm. press | 43. |
| 2 | <115° C./10 mm | 1. |
| 3 | 115°–122° C./10 mm | 23. |
| 4 | 122°–150° C./10 mm | 1. |
| Residue | >150° C./10 mm | 37 (including salt). |

*Part B.*—The benzene solution from Part A was recycled to the hydrolysis reactor and refluxed for 15 minutes with 60 grams of two weight percent HCl solution with stirring. Upon separation the aqueous layer was neutralized to give the fractions set forth in Table VI.

TABLE VI

| Fraction | Boiling Point | Weight (gms.) |
|---|---|---|
| 1 | <110° C./atm. press | 54. |
| 2 | <115° C./10 mm | 1. |
| 3 | 115°–122° C./10 mm | 14. |
| 4 | 122°–150° C./10 mm | 0. |
| Residue | >150° C./10 mm | 20.6 (including salt). |

*Part C.*—The benzene solution from Part B was recycled to the hydrolysis reactor and treated in the same manner as in Part B to give the fractions set forth in Table VII.

TABLE VII

| Fraction | Boiling Point | Weight (gms.) |
|---|---|---|
| 1 | <110° C./atm. press | 46. |
| 2 | <115° C./10 mm | 0.5. |
| 3 | 115°–122° C./10 mm | 9. |
| 4 | 122°–150° C./10 mm | 0. |
| Residue | >150° C./10 mm | 13 (including salt). |

EXAMPLE III

*Part A.*—Two hundred and seventy-five grams of the residue obtained from the distillation in Part C of Example I (B.P. >150° C./10 mm.), 70 ml. water and 10 g. Amberlite IR–120 in the hydrogen form (corresponding to about 0.07 milliequivalents of acid per gram of residue) were refluxed for 10 minutes. The resin was filtered off and the entire reaction mixture was distilled to give the fractions set forth in Table VIII.

TABLE VIII

| Fraction | Boiling Point | Weight (gms.) |
|---|---|---|
| 1 | <110° C./atm. press | Not recorded. |
| 2 | <115° C./10 mm | 5. |
| 3 | 115°–122° C./10 mm | 43. |
| 4 | 122°–150° C./10 mm | 1. |
| Residue | >150° C./10 mm | Not recorded. |

*Part B.*—The residue from the distillation in Part A was recycled to the same Amberlite resin with the addition of 70 ml. of water and treated in the same manner as in Part A. The fractions obtained are set forth in Table IX.

TABLE IX

| Fraction | Boiling Point | Weight (gms.) |
|---|---|---|
| 1 | <110° C./atm. press | Not recorded. |
| 2 | <115° C./10 mm | 2. |
| 3 | 115°–122° C./10 mm | 38. |
| 4 | 122°–150° C./10 mm | 0. |
| Residue | >150° C./10 mm | 151. |

EXAMPLE IV

*Part A.*—One hundred and seventy-four grams of DMDO residue (B.P. >150° C./10 mm.), obtained in Part B of Example I, 30 grams distilled water, 40 ml. xylene, and 86 grams Dowex 50–WX–4 ion-exchange resin in the acid form were heated at reflux with stirring for 15 minutes. The resin contained 56 grams water and is equivalent to about 1 milliequivalent of acid per gram of residue. The aqueous layer was separated and distilled to give the fractions set forth in Table X.

TABLE X

| Fraction | Boiling Point | Weight (gms.) |
|---|---|---|
| 1 | <110° C./atm. press | 34. |
| 2 | <115° C./10 mm | 2. |
| 3 | 115°–122° C./10 mm | 12. |
| 4 | 122°–150° C./10 mm | 1. |
| Residue | >150° C./10 mm | 23. |

*Part B.*—Eight ml. distilled water were added to the xylene solution and ion-exchange resin of Part A and the procedure of Part A was repeated.

*Part C.*—Sixty ml. distilled water were added to the xylene solution and resin of Part B and the procedure of Part A was repeated.

*Part D.*—Fifty-four ml. distilled water were added to the xylene solution and resin of Part C and the procedure of Part A was repeated.

*Part E.*—Forty-eight ml. distilled water were added to the xylene solution and resin of Part D and the procedure of Part A was repeated.

The fractions obtained are set forth in Table XI.

TABLE XI

| Fraction | Boiling Point | Weight (gms.) | | | |
|---|---|---|---|---|---|
| | | Part B | Part C | Part D | Part E |
| 1 | <110° C./atm. press | 81 | 61 | 52 | 45 |
| 2 | <115° C./10 mm | 2 | 1 | 3 | 1.5 |
| 3 | 115°–122° C./10 mm | 18 | 8 | 4 | 0.5 |
| 4 | 122°–150° C./10 mm | 1 | 0 | 1 | 0.5 |
| Residue | >150° C./10 mm | 31.5 | 15.5 | 7 | 4 |

We claim:

1. A method for producing hydroxymethyl-dimethyl-meta-dioxanes of the formula

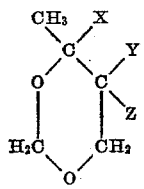

wherein one of the groups X, Y and Z is CH$_3$, one is CH$_2$OH, and one is H, from the products boiling above 135° C. at atmospheric pressure obtained by reacting at least one butene selected from the group consisting of isobutylene and butene-2 with an aldehyde selected from the group consisting of formaldehyde and substances yielding formaldehyde in the presence of an acid catalyst which comprises hydrolyzing said products in the presence of an acidic catalyst and recovering the compounds so formed.

2. The method according to claim 1 wherein the acidic catalyst is a dilute mineral acid.

3. The method according to claim 1 wherein the acidic catalyst is the hydrogen form of an ion-exchange resin of the sulfonated type.

4. A method for producing hydroxymethyl-dimethyl-meta-dioxanes of the formula

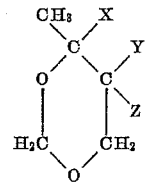

wherein one of the groups X, Y and Z is CH$_3$, one is CH$_2$OH and one is H, from the products boiling above 150° C. at 10 mm. obtained by reacting at least one butene selected from the group consisting of isobutylene and butene-2 with an aldehyde selected from the group consisting of formaldehyde and substances yielding formaldehyde in the presence of an acid catalyst which comprises hydrolyzing said products in the presence of an acidic catalyst and recovering the compounds so formed.

5. The method according to claim 4 wherein the acidic catalyst is a dilute mineral acid.

6. The method according to claim 4 wherein the acidic catalyst is the hydrogen form of an ion-exchange resin of the sulfonated type.

7. A method for producing hydroxymethyl-dimethyl-meta-dioxanes of the formula

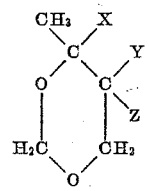

wherein one of the groups X, Y and Z is CH$_3$, one is CH$_2$OH and one is H, from the products boiling above 150° C. at 10 mm. obtained by reacting at least one butene selected from the group consisting of isobutylene and butene-2 with an aldehyde selected from the group consisting of formaldehyde and substances yielding formaldehyde in the presence of an acid catalyst which comprises contacting said products with an aqueous mineral acid catalyst, neutralizing the hydrolyzed material, separating the aqueous and organic layers thus formed, and recovering the desired products from said organic layer.

8. A method for producing hydroxymethyl-dimethyl-meta-dioxanes of the formula

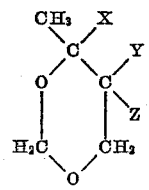

wherein one of the groups X, Y and Z is CH$_3$, one is CH$_2$OH and one is H, from the products boiling above 150° C. at 10 mm. obtained by reacting at least one butene selected from the group consisting of isobutylene and butene-2 with an aldehyde selected from the group consisting of formaldehyde and substances yielding formaldehyde in the presence of an acid catalyst which comprises contacting said products with an aqueous mineral acid catalyst, separating the aqueous and organic layers thus formed, neutralizing the aqueous layer and recovering the desired products from said neutralized aqueous layer.

9. A method for producing hydroxymethyl-dimethyl-meta-dioxanes of the formula

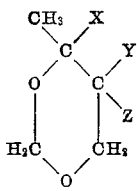

wherein one of the groups X, Y and Z is CH₃, one is CH₂OH and one is H, from the products boiling above 150° C. at 10 mm. obtained by reacting at least one butene selected from the group consisting of isobutylene and butene-2 with an aldehyde selected from the group consisting of formaldehyde and substances yielding formaldehyde in the presence of an acid catalyst which comprises contacting said products in the presence of water with the hydrogen form of an ion-exchange resin of the sulfonated type, separating the organic and aqueous layers thus formed and recovering the desired products from said aqueous layer.

10. A method for producing hydroxymethyl-dimethyl-meta-dioxanes of the formula

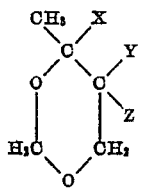

wherein one of the groups X, Y and Z is CH₃, one is CH₂OH and one is H, from the products boiling above 150° C. at 10 mm. obtained by reacting at least one butene selected from the group consisting of isobutylene and butene-2 with an aldehyde selected from the group consisting of formaldehyde and substances yielding formaldehyde in the presence of an acid catalyst which comprises contacting said products in the presence of water with the hydrogen form of an ion-exchange resin of the sulfonated type, separating the organic and aqueous layers thus formed, recycling said organic layer for further contact with said ion-exchange resin in the presence of water and recovering the desired products from said aqueous layer.

11. The method according to claim 10 further characterized in that the hydrolysis reaction is carried on in the presence of an unreactive solvent boiling between about 80° C. to about 144° C.

References Cited in the file of this patent
UNITED STATES PATENTS
2,504,732    Rosen _____ Apr. 18, 1950

UNITED STATES PATENT OFFICE
CERTIFICATE OF CORRECTION

Patent No. 3,000,905                            September 19, 1961

Edward S. Wheeler et al.

It is hereby certified that error appears in the above numbered patent requiring correction and that the said Letters Patent should read as corrected below.

Column 4, line 47, in the title of Part B of EXAMPLE I, for "135° C./10 mm." read -- 150° C./10 mm. --; column 5, TABLE III, column 3, line 3 thereof, for "965" read -- 9.65 --; column 6, line 7, for "of", first occurrence, read -- to --.

Signed and sealed this 20th day of February 1962.

(SEAL)
Attest:

ERNEST W. SWIDER                           DAVID L. LADD
Attesting Officer                               Commissioner of Patents